(12) United States Patent
Swope et al.

(10) Patent No.: US 7,202,815 B2
(45) Date of Patent: Apr. 10, 2007

(54) METHOD AND APPARATUS FOR LOCATION DETERMINATION

(75) Inventors: Charles B. Swope, Coral Springs, FL (US); Ruben Rivera, Sunrise, FL (US); Jeffrey A. Underwood, Sunrise, FL (US); John R. Melton, Coral Springs, FL (US); Charles R. Ruelke, Margate, FL (US)

(73) Assignee: Motorola, Inc., Schaumburg, IL (US)

( * ) Notice: Subject to any disclaimer, the term of this patent is extended or adjusted under 35 U.S.C. 154(b) by 295 days.

(21) Appl. No.: 10/916,821

(22) Filed: Aug. 12, 2004

(65) Prior Publication Data

US 2006/0033661 A1   Feb. 16, 2006

(51) Int. Cl.
  *G01S 5/02*  (2006.01)
(52) U.S. Cl. ...................... 342/427; 348/115
(58) Field of Classification Search ............... 342/427, 342/457, 464, 465; 348/115; 701/4, 5, 10, 701/16
See application file for complete search history.

(56) References Cited

U.S. PATENT DOCUMENTS

| | | | |
|---|---|---|---|
| 5,818,381 A | | 10/1998 | Williams |
| 5,864,481 A | * | 1/1999 | Gross et al. ................... 700/90 |
| 6,492,941 B1 | * | 12/2002 | Beason et al. ........... 342/357.1 |
| 6,934,633 B1 | * | 8/2005 | Gallagher et al. .......... 701/213 |
| 2006/0048286 A1 | * | 3/2006 | Donato ........................ 2/422 |

* cited by examiner

*Primary Examiner*—Dao L. Phan
(74) *Attorney, Agent, or Firm*—Barbara R. Doutre

(57) ABSTRACT

A location determination device (104) is worn on a user's head to facilitate searching and tracking for another individual carrying a portable radio (102) as well as locating exit routes. At least two antennas (108), a monopulse receiver (110) and a display are integrated into the location determination device (104). Location determination device (104) scans for an incoming signal (106) from the portable device (102) and coverts the signal into angular location data. The location data and egress information are displayed to the peripheral vision of the user of the location determination device (104).

18 Claims, 5 Drawing Sheets

METHOD AND APPARATUS FOR LOCATION DETERMINATION

TECHNICAL FIELD

This invention relates in general to location searching and tracking solutions and more particularly to location searching and tracking under adverse environments, such as smoke and fog.

BACKGROUND

Tactical in-building location solutions are becoming increasingly popular in first responder security situations. Resource management is the primary objective of the tactical approach, with incident command centers located at remote locations away from the environmental hazards. In the event of a man-down situation, the tactical system can identify and locate the individual under duress, select a resource unit closest to the incident, direct a rescue intervention team to the man-down using that resource unit, and then direct the team and rescued individual out to the safest location. The tactical approach requires a significant amount of resources including a very reliable radio frequency (RF) location system.

There exist some in-building rescue systems that can be carried by rescue personnel and deployed with little interaction from remote resources. Personal area network (PAN) devices generally refer to a computer network used close to one person. However, many of the PAN systems must be carried by hand and are bulky, cumbersome and hard to manage during rescue operations. The visual displays of such systems, if any, are typically mounted in the search unit carried by the rescue personnel. During intense smoke or moisture the display may become non-functional.

Newer face masks are being developed to facilitate rescue personnel. Self contained breathing apparatus (SCBA) devices may include a display mounted in the nose section of the facemask to provide the status of airtime, temperature and pressure. However, SCBA displays require the rescue personnel to visually focus on the display which can distract the user from the current task.

It would be highly beneficial to have a portable location determination device that provides improved display capability that is unobtrusive to the user's line of vision and minimizes the need to use hands for tracking and search functions.

BRIEF DESCRIPTION OF THE DRAWINGS

The features of the present invention, which are believed to be novel, are set forth with particularly in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
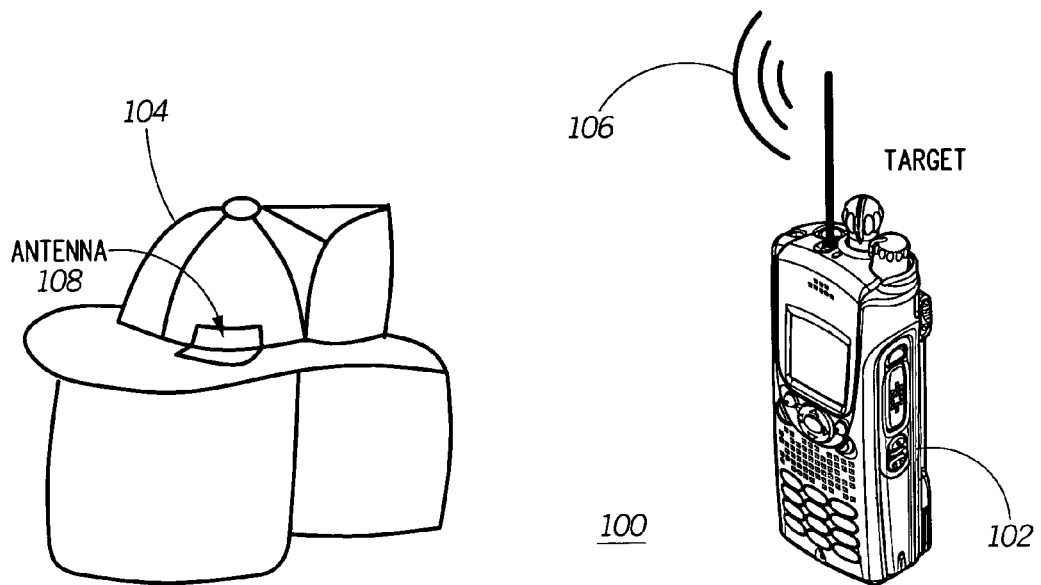
FIG. 1 is a communication system in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein a location determination device and location determination system that facilitates searching for and the tracking of individuals under adverse conditions. A head's-up-display to be worn on a user's head provides location direction route indicators to the user's peripheral vision. The head's-up-display may further indicate exit routes to the user's peripheral vision Referring now to FIG. 1, there is shown a communication system 100 in accordance with the present invention. Communication system 100 includes a portable radio 102 and in accordance with the present invention, a portable location determination device to be worn on a user's head, preferably in the form of a helmet or hat 104. In a search and track scenario, the user of helmet 104 is attempting to locate the user of portable radio 102 who is either in a "man-down" or "man-lost" situation and then remove that individual to the closest point of egress. For the purposes of this application, the user of portable radio 102 will also be referred to as a "target" or "second party". The target may be stationary or moving.

In accordance with the present invention, portable radio 102 generates a transmit signal 106 over a dedicated frequency or schedule of frequencies. The transmit signal 106 can be any signal capable of being received by a monopulse receiver, for example a periodic tone burst at 4.9 GHz or a continuous RF signal. Monopulse is a method known in the art of determining the angular location of a source of radiation or of a "target" that radiates or re-radiates energy.

Figure 2:
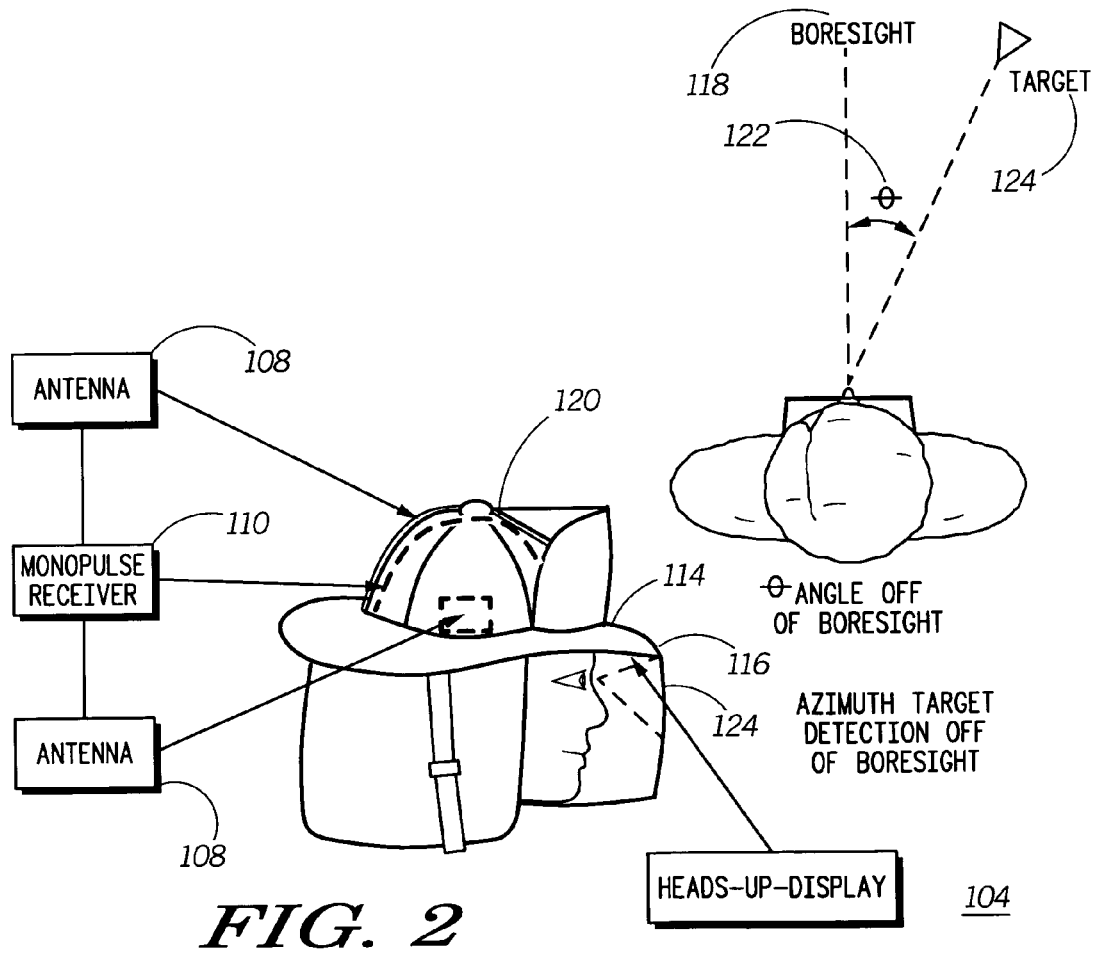
FIG. 2 is a partial block diagram of a helmet formed in accordance with an embodiment of the present invention.

FIG. 2 shows a partial block diagram of helmet 104 formed in accordance with an embodiment of the present invention. Helmet 104 includes a housing 120 having at least two antennas 108 and a monopulse receiver 110 integrated therein with which to scan for an incoming signal. In accordance with the present invention, helmet 104 provides a "scanning" indicator visible to the peripheral vision 116 of the wearer when within range of and receiving the transmitted signal 106 generated by the portable radio 102. The scanning indicator is preferably integrated within a brim 114 of the helmet 104 to provide a head's-up-display (HUD) 112 which does not impair or obstruct the user's field of view. Helmet 104 preferably includes a face guard 124 to minimize water and smoke intrusion, however the face guard is not required for operation of the location determination functionality. The HUD 112 can take on a variety of form factors, such as blinking or chaser LEDs or other display device known in the art.

In accordance with the present invention, helmet 104 receives the transmitted signal 106 through the plurality of antennas 108 and then establishes sum and difference patterns of the received signal to determine angular position of portable radio 102 relative to helmet 104. The direction in space in which azimuth and elevation difference patterns both have their nulls is called a boresight axis 118. The sum and difference patterns are used to calculate an angle off of boresight 122 which is used to lead the wearer of the helmet 104 to the target 124 (i.e. location of portable radio 102). In accordance with the present invention, the angle off of boresight 122 is communicated to the wearer of the helmet 104 via the HUD 110. The HUD 110 is dynamically updated as the wearer of the helmet 104 approaches or moves away from target 124. The orientation of the two antennas 108 determines either an azimuth or elevation angle off of boresight. The angular representation shown in FIG. 2 represents azimuth target detection off of boresight 124. To achieve both azimuth and elevation target detection at least four antennas should be incorporated into the helmet 104.

Figure 3:
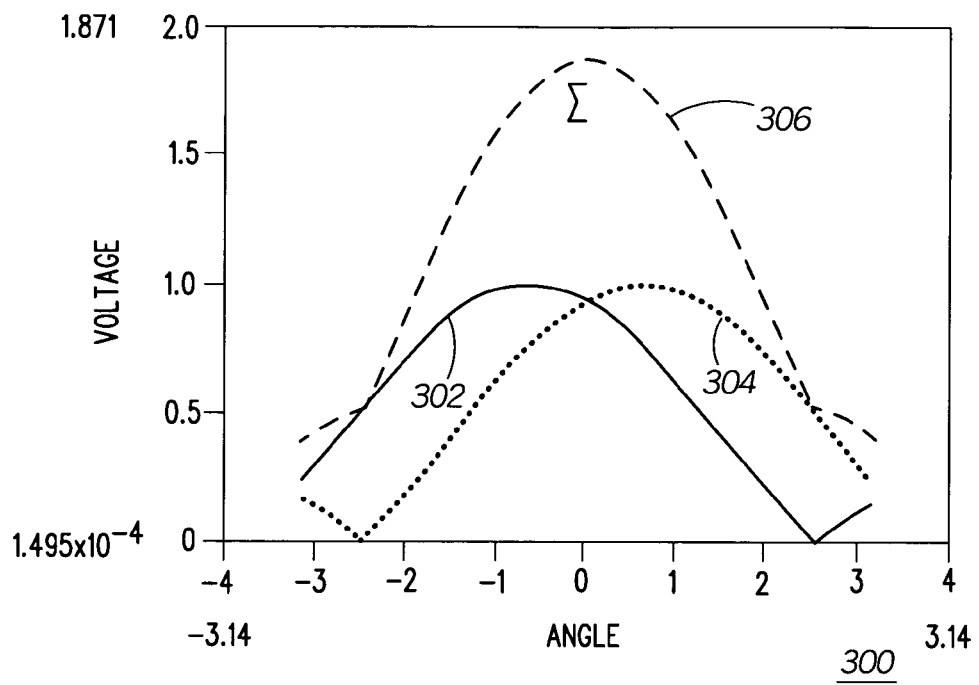
FIG. 3 is a graph representing an example of a summed antenna pattern.
Figure 4:
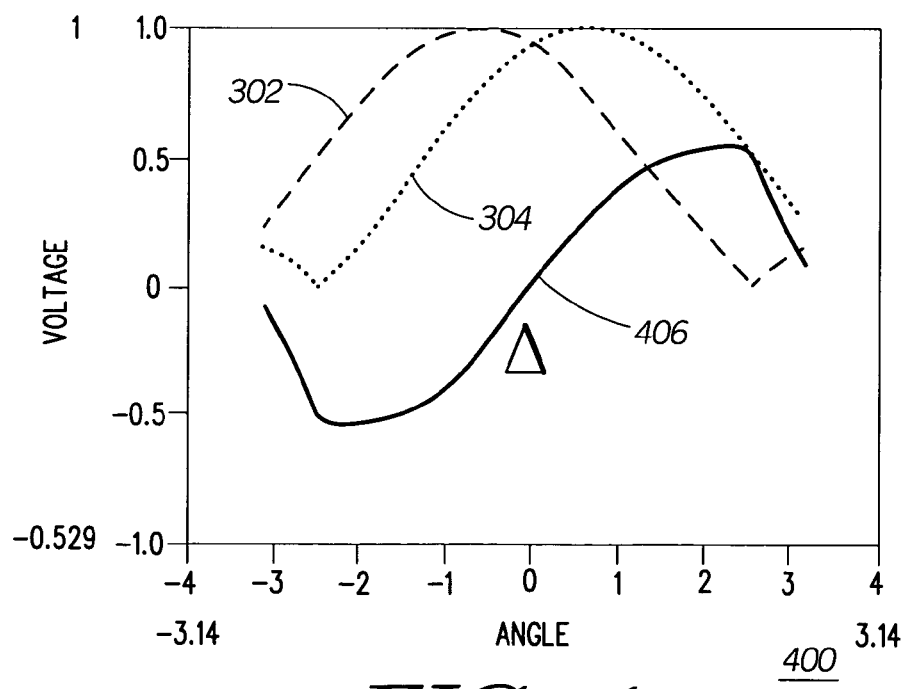
FIG. 4 is a graph representing a difference antenna pattern.

The antennas are preferably selected to establish highly directional pattern or polarization characteristics in the azimuth and elevation planes. Examples of such antennas include but are not limited to yagi or ceramic patch antennas. FIG. 3 shows a graph 300 representing an example of first and second antenna patterns 302, 304 that are summed as pattern 306. The vertical axis of graph 300 represents summer voltage output of the monopulse receiver and the horizontal axis represents angle off of boresight. FIG. 4 shows a graph 400 representing the first and second antenna patterns 302, 304 of FIG. 3 subtracted to form difference pattern 406.

Figure 5:
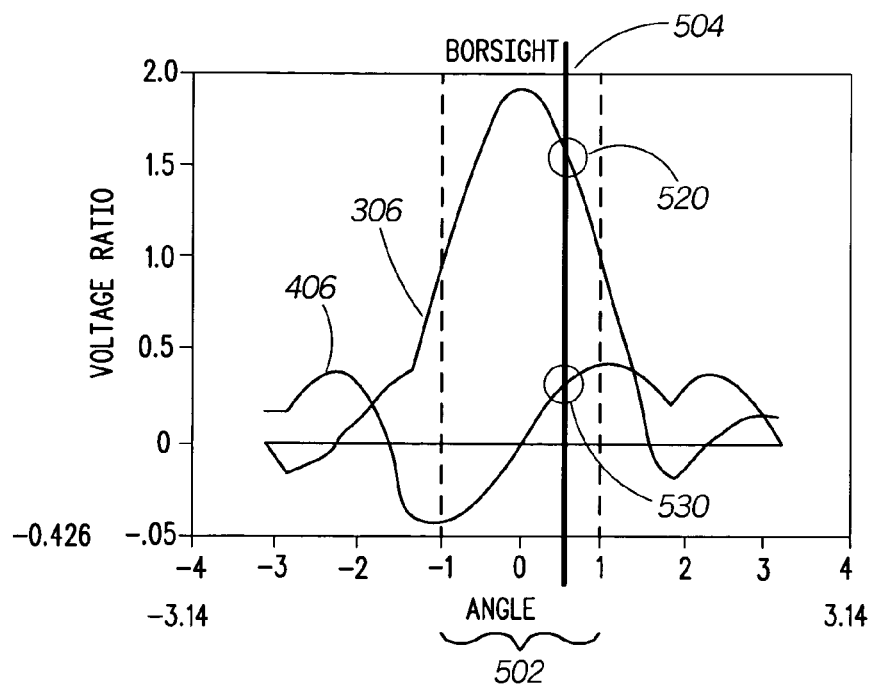
FIG. 5 is the sum and difference patterns of FIGS. 3 and 4 plotted between a boresight limit with a target.
Figure 6:
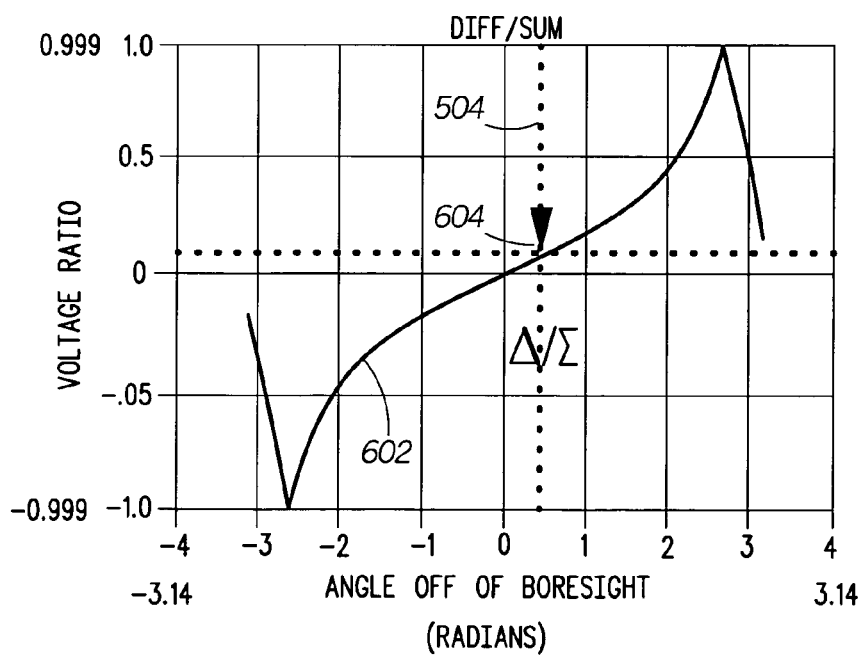
FIG. 6 is a graph representing a ratio of the difference over the sum which provides an angle off of boresight pattern.

FIG. 5 shows the sum and difference patterns 306, 406 plotted between a boresight limit (peripheral visual limit) 502 with a target 504 representing the location of the portable radio 102. The intersection points 520, 530 of the sum and difference patterns 306, 406 through the target 504 are used to calculate the angle off of boresight. FIG. 6 shows a graph 600 representing a ratio of the difference 520 over the sum 530 (diff/sum) which provides the angle off of boresight pattern 602. Target 504 cuts through the graph at voltage ratio level 606. Voltage ratio level 606 is sent to a controller. In accordance with the present invention, the diff/sum ratio is communicated to the wearer of the helmet through the HUD 110 in the form of LEDs, display or some other visual indicator within the user's peripheral vision. The visual indicator is dynamically updated as the wearer of the helmet approaches the target radio 102 and as the target radio moves about. The antenna patterns described in FIGS. 3–6 are shown as examples of two antenna orientation. As mentioned previously, to achieve both azimuth and elevation target detection, four or more antennas can be incorporated into the helmet 104.

Figure 7:
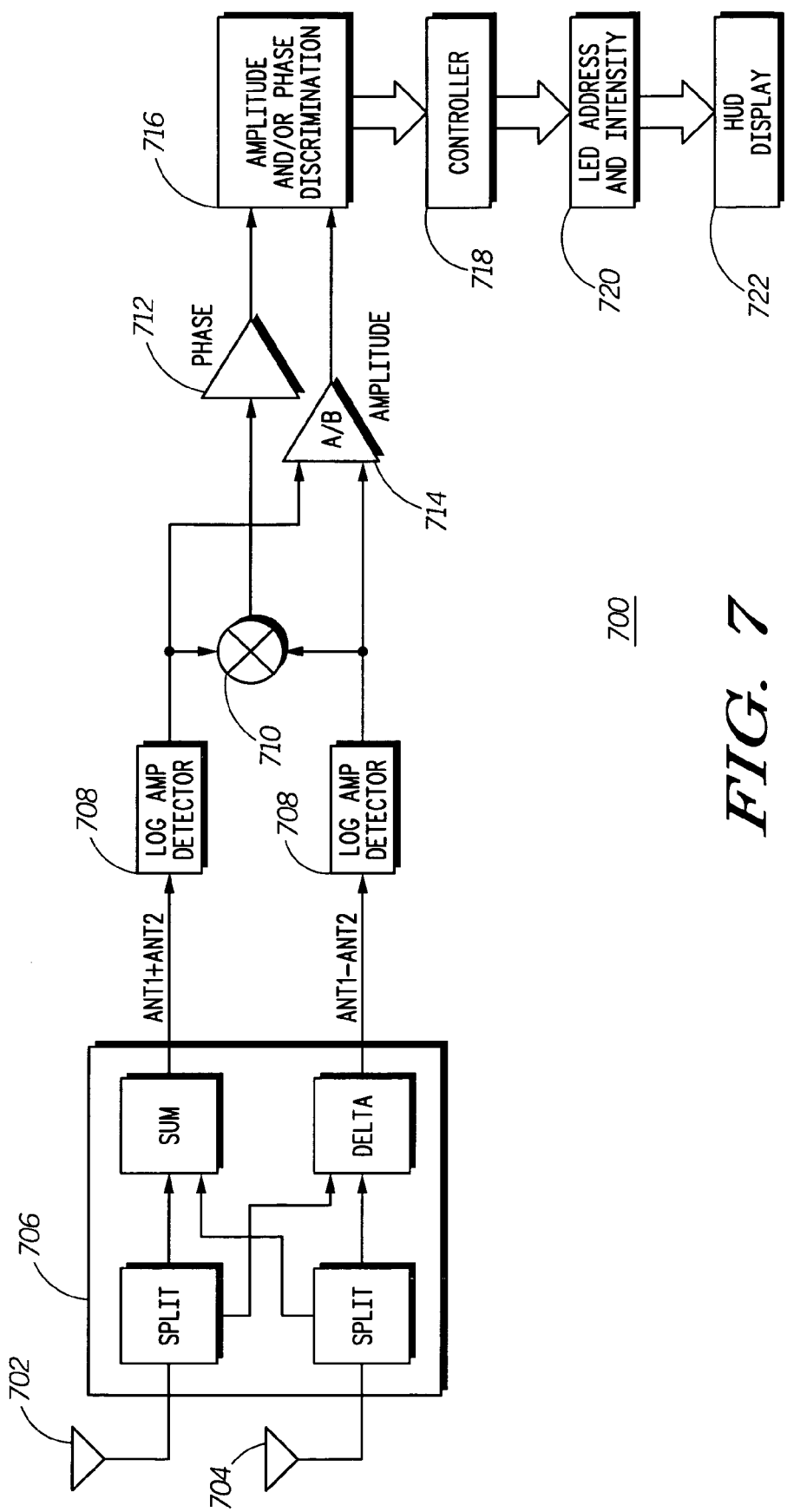
FIG. 7 is an electrical block diagram illustrating an example of a location determination device in accordance with an embodiment of the invention.

FIG. 7 is an electrical block diagram 700 illustrating an example of a location determination device 700 in accordance with a more detailed embodiment of the invention. First and second antennas 702, 704 receive a transmitted signal from a remote portable device (i.e. the target). Antenna 702, 704 are coupled to a receiver string comprising splitters, differentiators and summers 706, detectors 708, mixer 710, phase detectors 712, signal amplifiers 714 and discriminators 716. The receiver string converts the transmitted signal into angular location information which gets fed to controller 718. Controller 718 converts the angular location data into control signals for the HUD display 722. HUD display 722 provides the location information to the peripheral vision of the wearer of the location determination device 700. The wearer of device 700 can thus follow the display indicator to locate the target.

Figure 8:
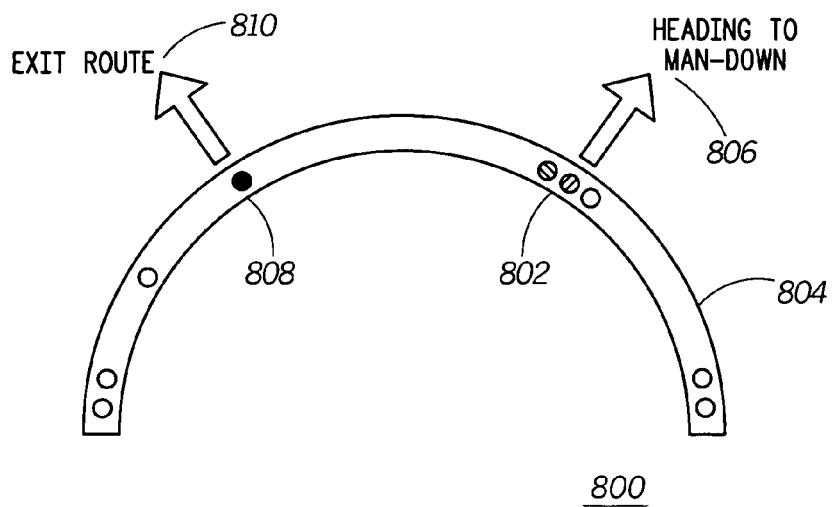
FIG. 8 is an example of an implementation for a head's-up-display (HUD) in accordance with an embodiment of the present invention.

FIG. 8 is an example of an implementation for the HUD 112 in accordance with an embodiment of the present invention. HUD 112 includes an array of LEDs 802 mounted to a substrate 804, such as a flex. Substrate 804 is preferably incorporated into or operatively coupled to the brim of helmet 104 of FIG. 1. The array of LEDs 802 may be multi-colored, single colored or combinations thereof and are distributed so as to be visible to the user's peripheral vision. The array of LEDs 802 is under control of a controller, such as described in FIG. 7, to indicate the location of the target or man-down 806. The angular location of the target 806 is communicated to the user and updated dynamically as the wearer gets closer to or moves further away from the target or as the target moves about. The display indicator can be provided by continuous or increased flashing of the LEDs and/or increased intensity or color changes. For example, a series of green LEDs can either flash or vary in intensity as the wearer of the device approaches or moves away from the target. The closest point of egress can also be indicated at the same time. For example, a red LED 808 can be used to indicate the closest exit route 810. A description of an example of how the closest path of egress can be determined follows.

Figure 9:
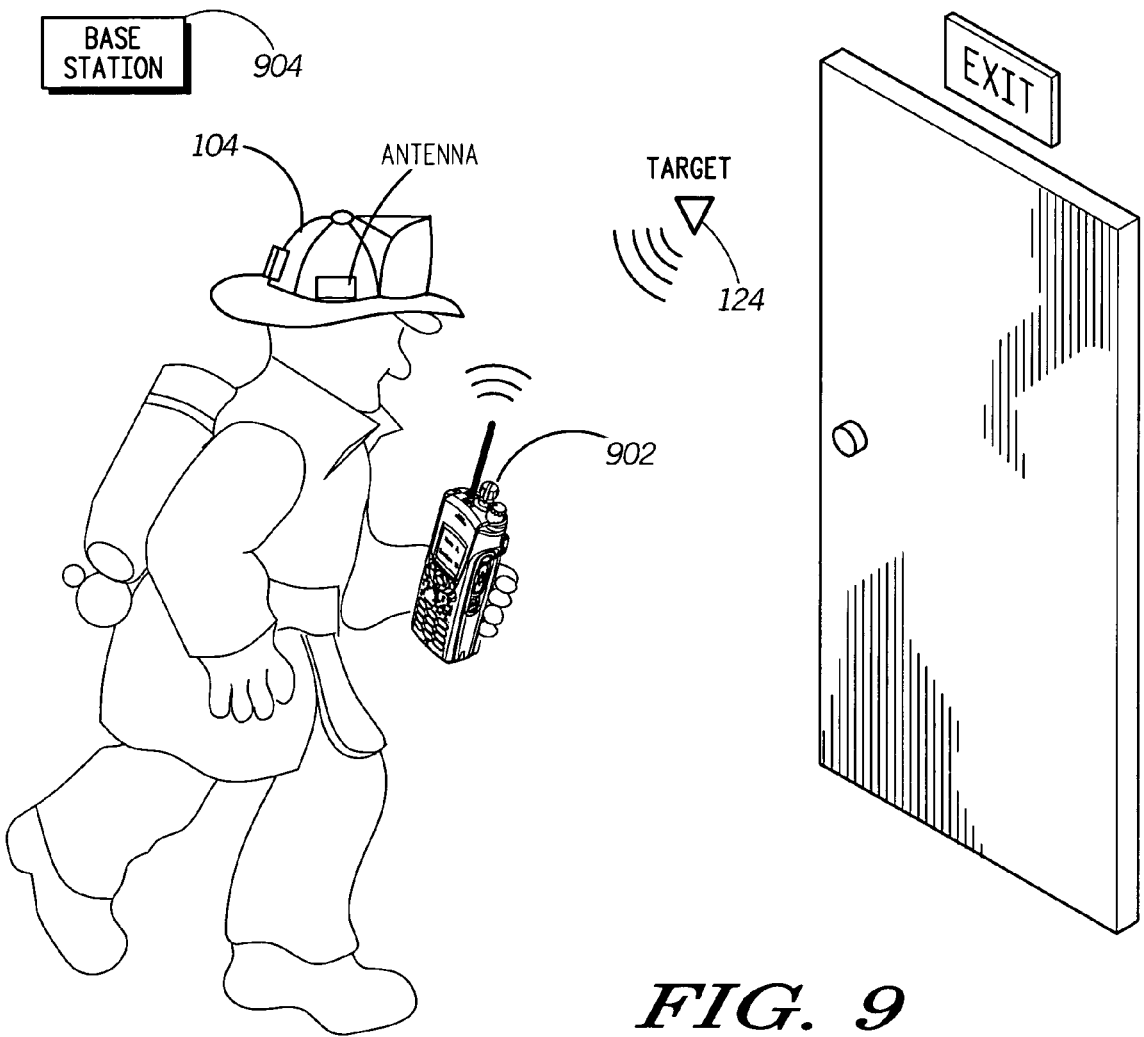
FIG. 9 is a further embodiment of the communication system of the invention incorporating the relaying of egress path data to the helmet of FIG. 1.

FIG. 9 is a further embodiment of the communication system of the invention wherein the wearer of the helmet 104 also uses a portable communication device, such as a two-way radio, having a Personal Area Network (PAN) device 902 coupled thereto or integrated therein. In accordance with this embodiment, PAN device 902 communicates with both the helmet 104 electronics and a remote base station 904, such as used in an APCO or TETRA radio system. In accordance with this embodiment, base station 904 relays egress path data, such as the closest exit route heading, to the PAN device 902, and the PAN device, in turn, transmits the egress data to the helmet 104. For example, the egress data can be relayed from an APCO base station to the PAN device over an APCO link, and the PAN device can transmit the data through either a wired link or wireless link (e.g. using an 802.11 protocol) to the helmet 104. In accordance with the invention, the helmet 104 processes the incoming egress data signal via the monopulse receiver and controller to provide control signals to the display. The wearer of helmet 104 can simply follow the indicators displayed on the HUD 112 as described above to find the closest exit.

The integration of a plurality of antennas 108, monopulse receiver 110 and HUD 112 into a housing 120 to be worn on a user's head, such as a helmet 104, provides a location determination device ideal for use by rescue personnel to satisfy wireless fidelity (WiFi) data requirements. Those skilled in the art will recognize that a full transceiver and different operating frequencies can be used if desired. Location searching and tracking as well as egress vectors can all be indicated to the wearer of the location determination device formed in accordance with the present invention. Displaying location and egress path indicators to the peripheral vision of the user allows for a natural, intuitive response from the user without distraction and without the use of hands. Smoke and water do not affect the display.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A helmet, including:
    a monopulse receiver for receiving a signal generated from a portable radio;
    a controller coupled to the monopulse receiver, the controller generating a control signal in response to the received signal; and
    a head's-up-display (HUD) coupled to the controller and responsive to the control signal, the HUD indicating a location of the portable radio to a wearer of the helmet via the wearer's peripheral vision.

2. A portable communication device, including:
    a housing to be worn on a user's head;
    a plurality of antennas integrated within the housing for receiving signals transmitted from a remote device;
    a monopulse receiver coupled to the plurality of antennas and providing angular location data of the remote device in response to the received signals;
    a controller for converting the angular location data into a corresponding control signal; and
    a display controlled by the controller, the display being updated to indicate to the user a location of the remote device.

3. The portable communication device of claim 2, wherein the display further indicates a directional heading for a nearby exit.

4. The portable communication device of claim 2, wherein the housing comprises a helmet.

5. The portable communication device of claim 2, wherein the plurality of antennas comprises two antennas whose orientations provide one of azimuth and elevation target detection off of boresight.

6. The portable communication device of claim 2, wherein the plurality of antennas comprise at least four antennas whose orientations provide both azimuth and elevation target detection off of boresight.

7. A helmet, including:
    an antenna array;
    a monopole receiver coupled to the antenna array for receiving a transmitted signal from a remote device, the remote device being either stationary or mobile; and
    a display coupled to the controller, the display indicating and dynamically updating a location of the remote device to a wearer of the helmet.

8. The helmet of claim 7, wherein the display comprises a head's-up-display integrated within a brim of the helmet.

9. A communication system, comprising:
    a portable radio generating a transmit signal;
    a helmet to be worn by a user, the helmet including:
        a plurality of antennas receiving the transmit signal;
        a receiver converting the transmit signal into angular location data; and
        a display indicating the angular location data to the user's peripheral vision.

10. The communication system of claim 9, wherein the display is a head's up display having a plurality of LEDs coupled thereto.

11. The communication system of claim 9, wherein the plurality of antennas comprises two antennas whose orientations provide one of azimuth and elevation target detection off of boresight.

12. The portable communication device of claim 9, wherein the plurality of antennas comprise at least four antennas whose orientations provide both azimuth and elevation target detection off of boresight.

13. The communication system of claim 9, further comprising:
    a base station generating a signal including egress data for a predetermined area;
    a PAN device communicating with the base station and the helmet; and
    the display of the helmet further indicating an egress path for the user of the helmet to follow based on the signal.

14. The communication system of claim 13, wherein the egress path and angular location data are displayed simultaneously on the display of the helmet.

15. A communication system, including:
    a housing to be worn on a user's head;
    an antenna array coupled to the housing;
    a monopulse receiver coupled to the antenna array for receiving signals pertaining to angular location of a second party with respect to the user and egress data;
    a controller for converting the angular location and egress data into control signals; and
    a head's-up-display (HUD) coupled to the controller, the HUD indicating and dynamically updating the angular location and egress data to the user's peripheral line of vision in response to the control signals.

16. The communication system of claim 15, further comprising:
    a portable personal area network (PAN) device,
    a base station providing the egress data, the base station relaying the egress data to the PAN device; and
    the portable PAN device receiving the egress data from the base station and transmitting it to the helmet.

17. The communication system of claim 16, wherein the base station and PAN device communicate over one of: an Association of Public-Safety Communications Officials International (APCO) link and a Terrestrial Trunked Radio (TETRA) link.

18. The communication system of claim 16, wherein the PAN device and helmet communicate over one of: a wired link and a wireless link.

* * * * *